United States Patent
Gautam et al.

(10) Patent No.: US 8,645,976 B2
(45) Date of Patent: Feb. 4, 2014

(54) APPLICATION PROGRAMMING INTERFACE (API) FOR RESTORING A DEFAULT SCAN LIST IN A WIRELESS COMMUNICATIONS RECEIVER

(75) Inventors: Shusheel Gautam, San Diego, CA (US); Michael DeVico, San Diego, CA (US); Robert Stacey, San Matco, CA (US); Phani Bhushan Avadhanam, San Diego, CA (US); Ying Gao, San Diego, CA (US); Jian Zhang, San Diego, CA (US); Paul Richard Ellis, San Diego, CA (US); Viktor Filiba, San Diego, CA (US); Tong Tang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1169 days.

(21) Appl. No.: 12/113,040

(22) Filed: Apr. 30, 2008

(65) Prior Publication Data

US 2009/0019461 A1      Jan. 15, 2009

Related U.S. Application Data

(60) Provisional application No. 60/915,929, filed on May 3, 2007, provisional application No. 60/915,931, filed on May 4, 2007.

(51) Int. Cl.
*G06F 9/46* (2006.01)
(52) U.S. Cl.
USPC ........... 719/328; 709/220; 709/221; 709/227; 709/229; 709/250
(58) Field of Classification Search
None
See application file for complete search history.

(56) References Cited

U.S. PATENT DOCUMENTS

| | | | |
|---|---|---|---|
| 5,638,371 A * | 6/1997 | Raychaudhuri et al. | ... 370/310.2 |
| 5,684,791 A * | 11/1997 | Raychaudhuri et al. | ... 370/310.2 |
| 5,758,291 A | 5/1998 | Grube et al. | |
| 6,141,690 A * | 10/2000 | Weiman | ........................ 709/228 |
| 6,393,482 B1 * | 5/2002 | Rai et al. | ........................ 709/225 |
| 6,393,496 B1 | 5/2002 | Schwaderer et al. | |
| 6,581,166 B1 * | 6/2003 | Hirst et al. | ..................... 714/4.4 |
| 6,981,047 B2 * | 12/2005 | Hanson et al. | ................ 709/227 |

(Continued)

FOREIGN PATENT DOCUMENTS

| | | |
|---|---|---|
| GB | 2396526 | 6/2004 |
| JP | 7049823 A | 2/1995 |

(Continued)

OTHER PUBLICATIONS

International Preliminary Report on Patentability, PCT/US2008/062539, International Bureau, The International Bureau of WIPO, Nov. 12, 2009.

(Continued)

*Primary Examiner* — Andy Ho
*Assistant Examiner* — Shih-Wei Kraft
(74) *Attorney, Agent, or Firm* — Fulbright & Jaworski LLP

(57) ABSTRACT

A signal may be received in accordance with a protocol stack having a first portion (400) that contains a control layer and a stream layer, and a second portion (401) that contains a physical layer and a MAC layer. The first portion may invoke an application program interface (API 1402) to instruct the second portion to replace a current set of signal acquisition parameters with an initial set of signal acquisition parameters.

8 Claims, 14 Drawing Sheets

(56) References Cited

U.S. PATENT DOCUMENTS

| | | | |
|---|---|---|---|
| 6,985,461 B2* | 1/2006 | Singh | 370/329 |
| 7,099,654 B1 | 8/2006 | Tewfik | |
| 7,539,169 B1* | 5/2009 | O'Hara et al. | 370/338 |
| 7,689,221 B1* | 3/2010 | Gazzard | 455/437 |
| 7,805,140 B2* | 9/2010 | Friday et al. | 455/436 |
| 2002/0085516 A1* | 7/2002 | Bridgelall | 370/329 |
| 2002/0136268 A1* | 9/2002 | Gan et al. | 375/133 |
| 2002/0176366 A1* | 11/2002 | Ayyagari et al. | 370/245 |
| 2002/0176386 A1* | 11/2002 | Singh | 370/338 |
| 2003/0139184 A1* | 7/2003 | Singh et al. | 455/436 |
| 2003/0195002 A1* | 10/2003 | Singhal et al. | 455/436 |
| 2003/0214943 A1* | 11/2003 | Engstrom et al. | 370/353 |
| 2003/0229685 A1 | 12/2003 | Twidale et al. | |
| 2004/0023665 A1* | 2/2004 | Simmonds et al. | 455/456.1 |
| 2004/0103275 A1* | 5/2004 | Ji et al. | 713/150 |
| 2004/0166838 A1* | 8/2004 | Backes et al. | 455/418 |
| 2005/0002363 A1 | 1/2005 | Cheng et al. | |
| 2005/0163078 A1* | 7/2005 | Oba et al. | 370/331 |
| 2005/0289214 A1 | 12/2005 | Adjakple et al. | |
| 2006/0029098 A1* | 2/2006 | Marinier et al. | 370/468 |
| 2006/0039486 A1* | 2/2006 | Rhee et al. | 375/260 |
| 2006/0104231 A1* | 5/2006 | Gidwani | 370/328 |
| 2006/0133409 A1 | 6/2006 | Prakash et al. | |
| 2006/0171357 A1* | 8/2006 | King et al. | 370/331 |
| 2006/0193295 A1* | 8/2006 | White et al. | 370/336 |
| 2006/0215581 A1* | 9/2006 | Castagnoli | 370/254 |
| 2006/0221914 A1* | 10/2006 | Waxman | 370/338 |
| 2006/0242457 A1* | 10/2006 | Roy et al. | 714/12 |
| 2007/0002742 A1 | 1/2007 | Krishnaswamy et al. | |
| 2007/0014273 A1 | 1/2007 | Kuperschmidt et al. | |
| 2007/0030826 A1* | 2/2007 | Zhang et al. | 370/331 |
| 2007/0066313 A1 | 3/2007 | Collins et al. | |
| 2007/0121540 A1* | 5/2007 | Sharp et al. | 370/328 |
| 2007/0173283 A1* | 7/2007 | Livet et al. | 455/552.1 |
| 2007/0177495 A1* | 8/2007 | Ametsitsi | 370/208 |
| 2007/0224986 A1* | 9/2007 | Bakshi et al. | 455/436 |
| 2008/0176546 A1 | 7/2008 | Devico et al. | |
| 2009/0019460 A1 | 1/2009 | Gautam et al. | |

FOREIGN PATENT DOCUMENTS

| | | |
|---|---|---|
| JP | 2002271436 | 9/2002 |
| JP | 2003331389 A | 11/2003 |
| JP | 2005130474 A | 5/2005 |
| JP | 2007515833 A | 6/2007 |
| JP | 2008538687 | 10/2008 |
| TW | I245501 B | 12/2005 |
| TW | I252630 B | 4/2006 |

OTHER PUBLICATIONS

International Search Report—PCT/US08/062539—International Search Authority, European Patent Office—Sep. 8, 2008.
Written Opinion—PCT/US08/062539—International Search Authority, European Patent Office—Sep. 8, 2008.
Bianchi G., et al., "A programmable MAC," Universal Personal Communications, 1998. ICUPC '98. IEEE 1998 International Conference on Florence, Italy Oct. 5-9, 1998, New York, NY, USA, IEEE, vol. 2, Oct. 5, 1998, pp. 953-957.
Taiwan Search Report—TW097102545—TIPO—Sep. 11, 2011.
Tia: "Forward Link Only Air Interface Specification" Rev. 1.1, Physical Layer, FLO Forum Technical Contribution to TR47, Dec. 22, 2005, pp. 5-8 to 5-24.
Taiwan Search Report—TW097116561—TIPO—Feb. 4, 2012.

* cited by examiner

APPLICATION PROGRAMMING INTERFACE (API) FOR RESTORING A DEFAULT SCAN LIST IN A WIRELESS COMMUNICATIONS RECEIVER

CLAIM OF PRIORITY UNDER 35 U.S.C. §119

The present application for patent claims priority to co-pending Provisional Application Nos. 60/915,929 (filed May 3, 2007) and 60/915,931 (filed May 4, 2007), both assigned to the assignee hereof, and both hereby expressly incorporated by reference herein.

REFERENCE TO CO-PENDING APPLICATION FOR PATENT

The present application for patent is related to co-pending U.S. patent application Ser. No. 11/828,167, filed Jul. 25, 2007, assigned to the assignee hereof, and expressly incorporated by reference herein.

BACKGROUND

1. Field

The present disclosure relates generally to communication systems and methods, and more particularly, to an application programming interface (API) for a receiver in a wireless communication device.

2. Background

Forward Link Only (FLO) is a digital wireless technology that has been developed by an industry-led group of wireless providers. FLO technology uses advances in coding and interleaving to achieve high-quality reception, both for real-time content streaming and other data services. FLO technology can provide robust mobile performance and high capacity without compromising power consumption. The technology also reduces the network cost of delivering multimedia content by dramatically decreasing the number of transmitters needed to be deployed. In addition, FLO technology-based multimedia multicasting compliments wireless operators' cellular network data and voice services, delivering content to the same cellular mobile terminals used in 3G networks.

Today, FLO technology is used to create and broadcast real time multimedia content across various networks to a large number of mobile subscribers. These mobile subscribers generally employ a FLO receiver, which can be described conceptually with a reference model comprising a number of processing layers, typically referred to as a "protocol stack". Each processing layer includes one or more entities that perform specific functions.

An attractive feature of the protocol stack employed by the FLO receiver is that each layer is self-contained so that the functions performed by one layer can be performed independently of the functions performed by the other layers. This allows improvements to be made to the FLO receiver for one layer without adversely affecting the other layers. However, various challenges are posed when designing the interface between layers in the FLO receiver. Efficient communications across layers in terms of efficient reception of multicast services is always an objective the FLO receiver designer.

SUMMARY

A signal may be received in accordance with a protocol stack having a first portion that contains a control layer and a stream layer, and a second portion that contains a physical layer and a MAC layer. The first portion may invoke an application program interface (API) to instruct the second portion to replace a current set of signal acquisition parameters with an initial set of signal acquisition parameters.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, various concepts will be described in the context of a FLO technology. While these concepts may be well suited for this application, those skilled in the art will readily appreciate that these concepts are likewise applicable to other technology. Accordingly, any reference to FLO technology is intended only to illustrate theses concepts, with the understanding that such concepts have a wide range of applications.

Figure 1:
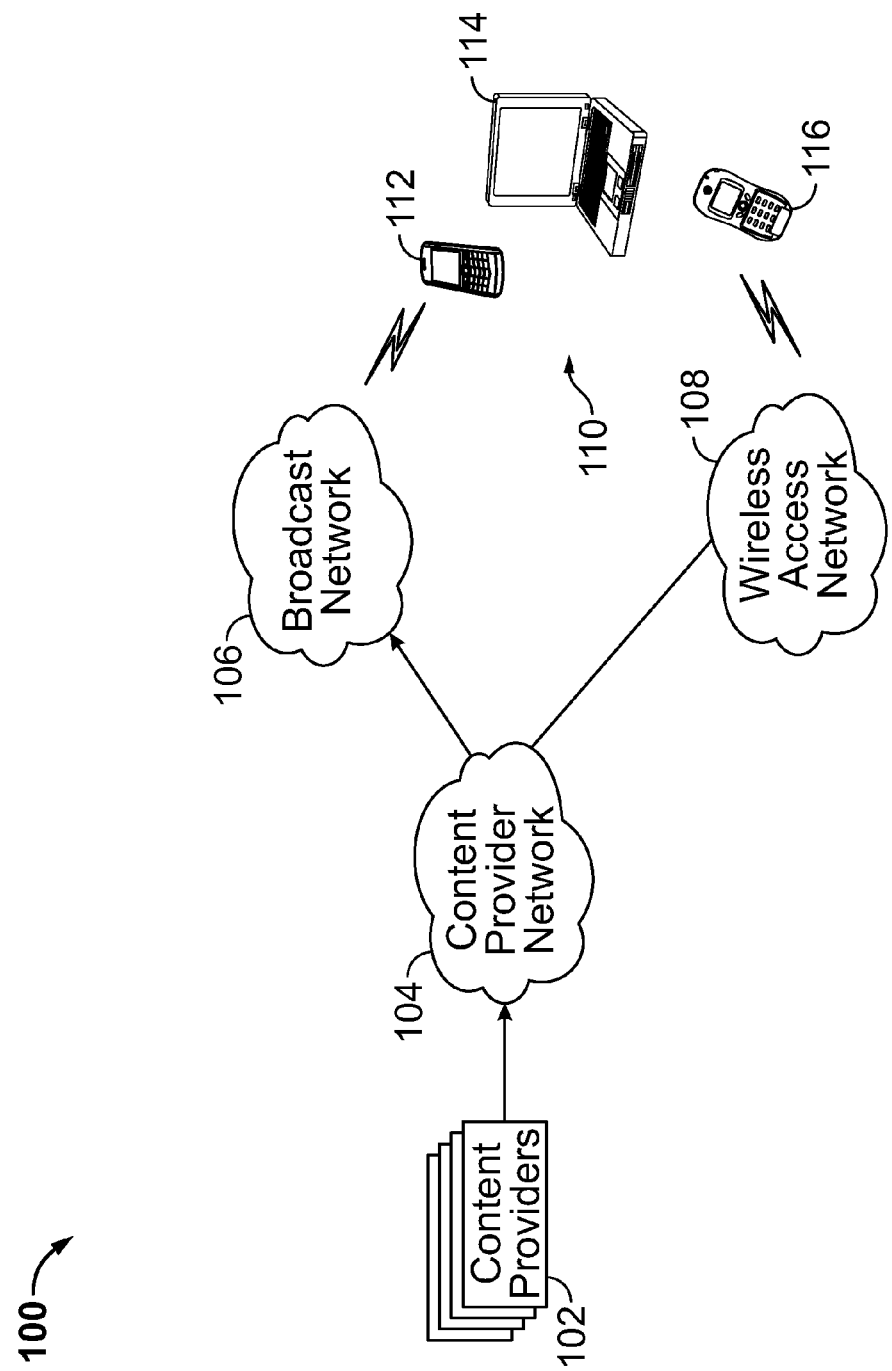
FIG. 1 is a conceptual diagram illustrating an example of a communications system.

FIG. 1 shows a communications system 100 that creates and broadcasts multimedia content across various networks to a large number of mobile subscribers. The communications system 100 includes any number of content providers 102, a content provider network 104, a broadcast network 106, and a wireless access network 108. The communications system 100 is also shown with a number of devices 110 used by mobile subscribers to receive multimedia content. These devices 110 include a mobile telephone 112, a personal digital assistant (PDA) 114, and a laptop computer 116. The devices 110 illustrate just some of the devices that are suitable for use in the communications systems 100. It should be noted that although three devices are shown in FIG. 1, virtually any number of analogous devices or types of devices are suitable for use in the communications system 100, as would be apparent to those skilled in the art.

The content providers 102 provide content for distribution to mobile subscribers in the communications system 100. The content may include video, audio, multimedia content, clips, real-time and non real-time content, scripts, programs, data or any other type of suitable content. The content providers 102 provide content to the content provider network for wide-area or local-area distribution.

The content provider network 104 comprises any combination of wired and wireless networks that operate to distribute content for delivery to mobile subscribers. In the example illustrated in FIG. 1, the content provider network 104 distributes content through a broadcast network 106. The broadcast network 106 comprises any combination of wired and wireless proprietary networks that are designed to broadcast high quality content. These proprietary networks may be distributed throughout a large geographic region to provide seamless coverage to mobile devices. Typically, the geographic region will be divided into sectors with each sector providing access to wide-area and local-area content.

The content provider network 104 may also include a content server (not shown) for distribution of content through a wireless access network 108. The content server communicates with a base station controller (BSC) (not shown) in the wireless access network 108. The BSC may be used to manage and control any number of base transceiver station (BTS)s (not shown) depending on the geographic reach of the wireless access network 108. The BTSs provide access to wide-area and local-area for the various devices 110.

The multimedia content broadcast by the content providers 102 include one or more services. A service is an aggregation of one or more independent data components. Each independent data component of a service is called a flow. By way of example, a cable news service may include three flows: a video flow, an audio flow, and a control flow.

Services are carried over one of more logical channels. In FLO applications, a logical channel is often referred to as a Multicast Logical Channel (MLC). A logical channel may be divided into multiple logical sub-channels. These logical sub-channels are called streams. Each flow is carried in a single stream. The content for a logical channel is transmitted through the various networks in a physical frame. In FLO applications, the physical frame is often referred to as a superframe.

The air interface used to transmit the physical frames to the various devices 110 shown in FIG. 1 may vary depending on the specific application and the overall design constraints. In general, communication systems employing FLO technology utilize Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). OFDM is a multi-carrier modulation technique that effectively partitions the overall system bandwidth into multiple (N) sub-carriers. These sub-carriers, which are also referred to as tones, bins, frequency channels, etc., are spaced apart at precise frequencies to provide orthogonality. Content may be modulated onto the sub-carriers by adjusting each sub-carrier's phase, amplitude or both. Typically, quadrature phase shift keying (QPSK) or quadrature amplitude modulation (QAM) is used, but other modulation schemes may also be used.

Figure 2:
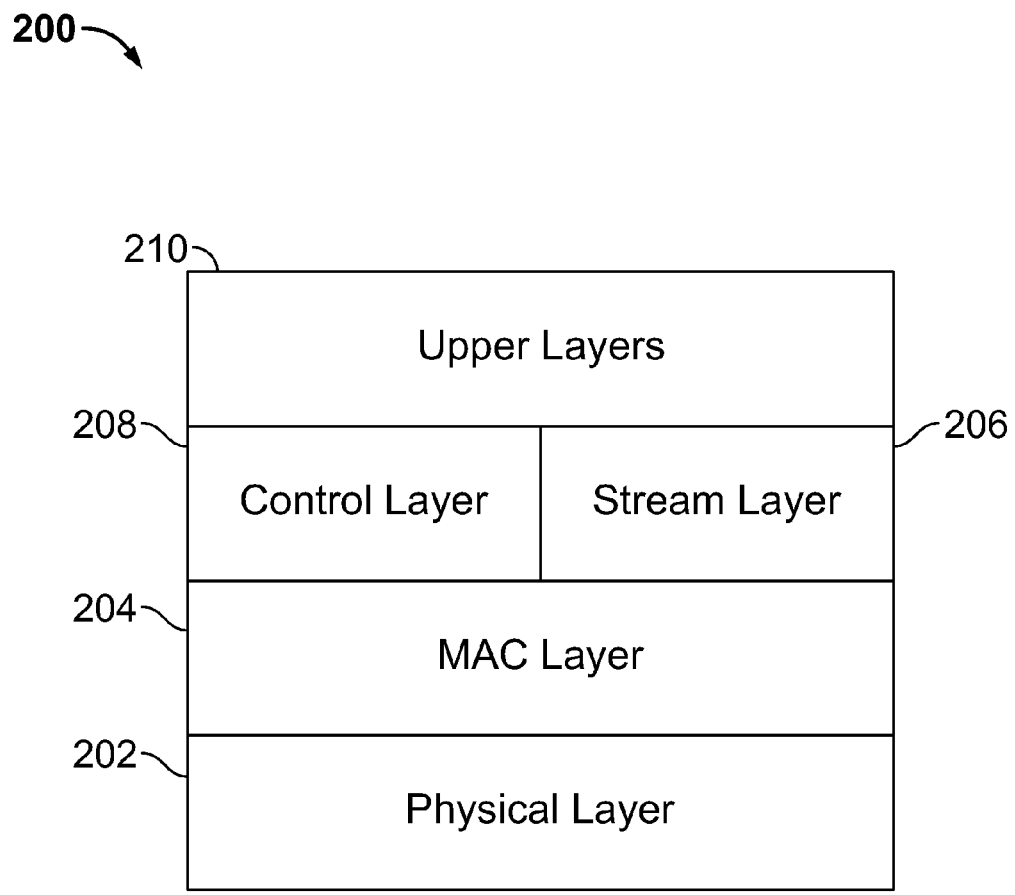
FIG. 2 is a conceptual diagram illustrating an example of a protocol stack for a receiver.

FIG. 2 is a conceptual diagram illustrating an example of a protocol stack 200 for the receiver used in one or more of the devices 110 shown in FIG. 1. The protocol stack, is shown with a physical layer 202, a Medium Access Control (MAC) layer 204, a stream player 206, a control layer 208, and a number of upper layers 210. The upper layers 210 provide multiple functions including compression of multimedia content and controlling access to the multimedia content. The control layer 208 is used to process control information that facilitates the operation of the device in the communications system. The receiver also uses the control layer to maintain synchronization of its control information with that in the communications system. The stream layer 206 provides for binding of upper layer flows to streams. The stream layer is at the same level as the control layer in the protocol stack 200 of the receiver. The MAC layer 204 provides multiplexing of packets belonging to different media streams associated with the logical channels. The MAC layer 204 defines the procedures used to receive and transmit over the physical layer 202. The physical layer provides the channel structure, frequency, power output modulation and encoding specification for the air interface.

Figure 3:
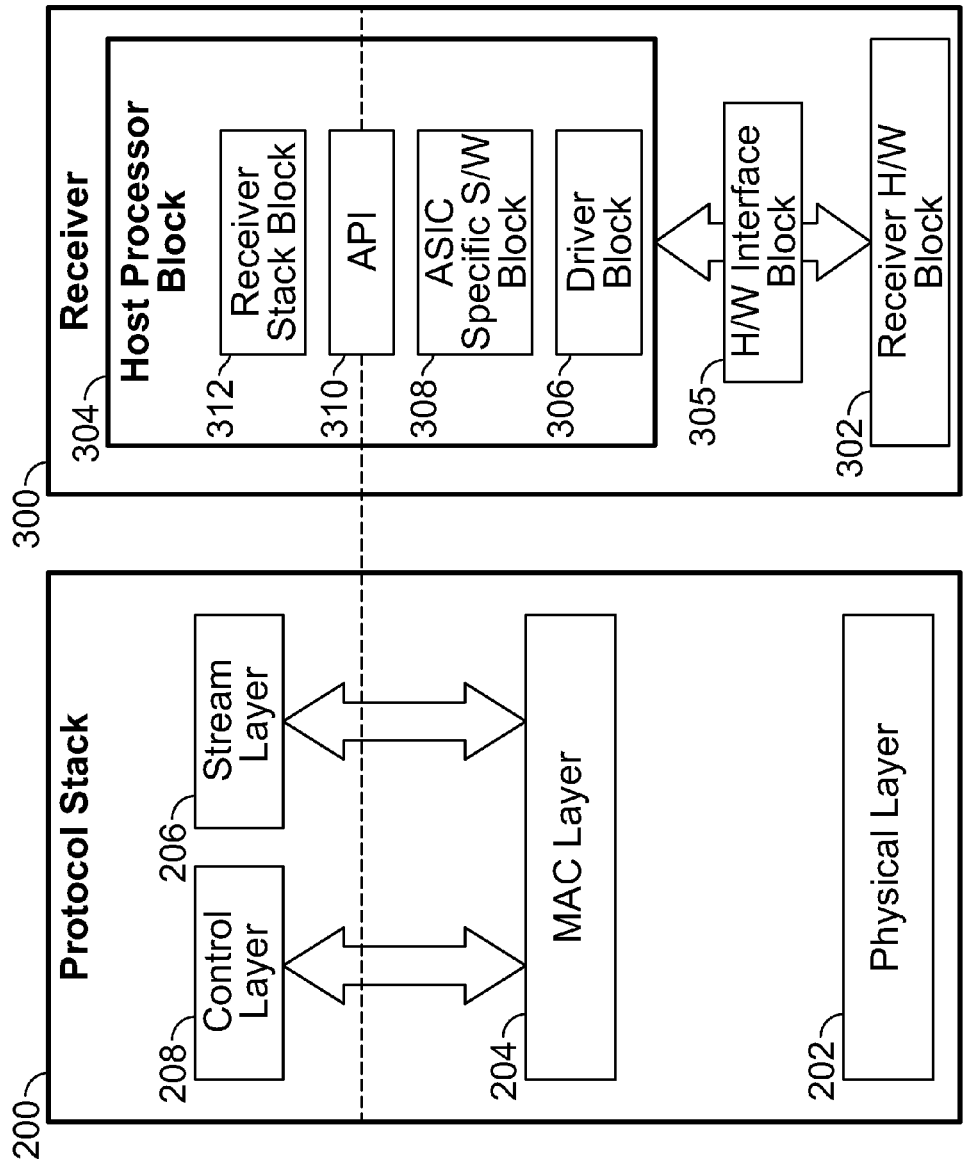
FIG. 3 is a conceptual diagram illustrating various receiver blocks and their relationship to the protocol stack of FIG. 2.

FIG. 3 is a conceptual diagram illustrating various receiver blocks and their relationship to the protocol stack of FIG. 2. In this example, the receiver 300 includes receiver hardware block 302, a host processor block 304, and a hardware interface block 305. The receiver hardware block 302 will be described as an application specific integrated circuit (ASIC), but may have different hardware implementations depending on the particular application and the overall design requirements. The host processor block 304 is shown with a driver block 306 (hardware specific abstraction layer), an ASIC specific software block 308, and a receiver stack block 312. An application program interface (API) 310 is used to interface the ASIC specific software block 308 to the receiver stack block 312.

The receiver blocks located below the API 310 will be collectively referred to as a media processing system. The media processing system provides the physical and MAC layer 202, 204 functionality of the protocol stack 200. The receiver stack block 312, located above the API 310, will be referred to as the receiver stack processing system, which provides the stream and control layer 206, 208 functionality of the protocol stack 200. The exact division of the protocol functionality in the media processing system or in the receiver stack processing system is implementation dependent. By way of example, the MAC layer 204 can be localized in the ASIC specific software block 308 for one implementation while for another implementation it may be spread across all blocks in the media processing system, namely the receiver hardware block 302, the driver block 306 and the ASIC specific software block 308.

The functionality of the receiver blocks will now be described. This description is informative in nature and broadly defines the functionality of each block. Only the pertinent functionality to various concepts described throughout this disclosure will be described. Those skilled in the art will recognize that these blocks can provide other functionality that is not described herein.

The receiver hardware block 302 represents the semiconductor hardware that provides the functionality of demodulating a wireless signal and retrieving data carried by the physical layer. This block 302 provides various functions such as RF front-end processing, ADC, timing and frequency estimation, channel estimation, turbo decoding etc. In summary, the receiver hardware block 302 provides the complete physical layer 202 implementation of the protocol stack. Depending upon the implementation, this block 302 may also provide full or partial MAC layer 204 functionality (e.g. low level MAC layer functionality like R-S decoding and/or MAC layer interleaving).

The host processor block 304 represents the functionality provided by a host processor in the receiver 300. More specifically, the host processor block 304 represents the host processor hardware and the software implementation residing in the host processor. The host processor hardware may be implemented with one or more processors, including by way of example, a general purpose processor, such as a microprocessor, and/or a specific application processor, such as a digital signal processor (DSP). The host processor block 304 may also include a machine readable medium for storing software executed by the one or more processors. Software shall be construed broadly to mean any combination of instructions, data structures, or program code, whether referred to as software, firmware, middleware, microcode, or any other terminology. The machine readable medium may include one or more storage devices that are implemented, either in whole or part, by the host processor hardware. The machine readable medium may also include or more storage devices remote to the host processor, a transmission line, or a carrier wave that encodes a data signal. Those skilled in the art will recognize how best to implement the described functionality for the host processor block 304 for each particular application.

The host processor block 304 communicates with the receiver hardware block 302 to retrieve and process information recovered from the wireless transmission. The retrieved information includes control information received on a control channel, content received on an overhead channel, and the application layer content carried in a logical channel.

The driver block 306 represents the driver level software in the host processor block 304 that directly interfaces with the receiver hardware block 302. The driver block 306 provides controller functions (e.g. turning on or turning off the receiver hardware block 302) and data exchange functions (e.g. retrieving the data from the receiver hardware block 302 or conveying the characteristics of a logical channel to be received). The driver level software may be specific to the type of hardware interface mechanism that exists between the host processor and the receiver hardware. For example, the driver level software may be different depending upon whether the hardware interface between the one or more processors in the host processor and the receiver hardware is interrupt driven, implemented with memory mapped address/registers or packet based transaction interface like SDIO. Some examples of tasks performed by the driver block 306 include hardware interactions such as initialization, sleep or wakeup triggers, data exchange with hardware such as emptying hardware buffers into main memory or providing ISR implementation, and MAC layer implementation to support inner-frame sleep logic.

Generally, the driver block 306 functions are tightly coupled with the receiver hardware and are considered time sensitive in nature. Therefore, the driver block 306 may be given a higher priority with respect to other blocks shown in FIG. 3 For example, the driver block 306 may perform the tasks of retrieving the data received by the receiver hardware or instructing the receiver hardware to tune to a frequency as requested by the application layer.

The ASIC specific software block 308 provides the MAC layer functionality not handled by the driver block 306. Depending upon the division of MAC layer functionality across different blocks, it may provide complete or partial MAC layer functionality. At the very least, ASIC specific software block 308 will generally provide high level MAC layer functionality that is not practical to be delegated to driver block 306.

The receiver stack block 312 communicates with the ASIC specific software block 308 using the API 310. The receiver stack block 312 implements the control and stream layers and provides the interface with the application layer protocols. The receiver stack block 312 triggers the ASIC specific software block 308 to receive the specified contents as requested by the application layer. The receiver stack block 312 acts on the notifications or content provided by the ASIC specific software block 308 and delivers any content received from the ASIC specific software block 308 to the application layer protocols.

The API 310 defines the interfaces that allow the ASIC specific software block 308 to communicate with the receiver stack block 312. Any receiver stack that adheres to the interfaces defined by the API 310 will work with an ASIC specific software that adheres to these interfaces as well. The API 310 is representative of an API facility that includes a plurality of distinct APIs which respectively define the aforementioned interfaces that allow communication between the ASIC specific software block 308 and the receiver stack block 312. Examples of these APIs, and the interfaces they define, are presented in greater detail below.

The hardware interface block 305 represents the hardware interface mechanism that exists between the host processor block 304 and the receiver hardware block 302. This interface provides the communication and data exchange functionality. The driver block 306 uses this interface 305 to exchange commands and data with the receiver hardware block 302. The hardware interface block 305 can be any desired interface, such as proprietary bus interface or a standard based interface (e.g. SDIO).

Various examples will now be presented illustrating the communication that takes place within the receiver 300 across the API 310. The following examples will be described in connection with FIGS. 4-11 containing call flows. In these figures, solid arrows indicate communication occurring over the API 310. The role played by the receiver blocks and communication occurring within the blocks in the receiver stack processing system 400 and media processing system 401 is presented for the sake of completeness only. As previously mentioned, the actual role played by the individual receiver blocks and the communication between the blocks located in either of these processing systems (i.e., on the same side of the API 310) is implementation dependent and can vary from one implementation to another. This communication is depicted as dashed arrows in the figures.

Figure 4:
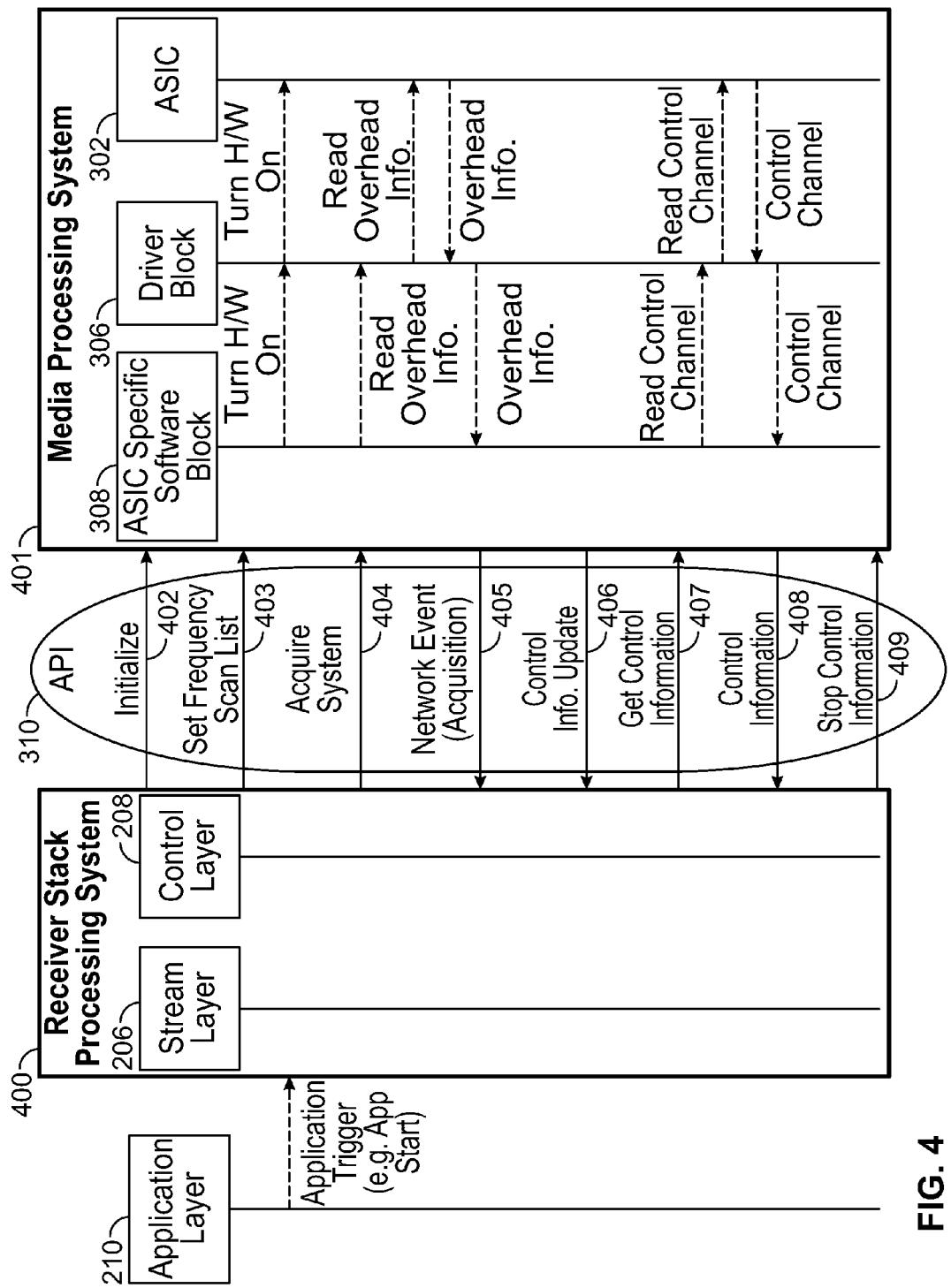
FIG. 4 is a diagram illustrating an example of the call flow to turn on the receiver.

FIG. 4 is a diagram illustrating an example of the call flow to turn on the receiver. In step 402, an initialize command from the receiver stack processing system 400 is sent to the ASIC specific software block 308 to enable the receiver. This command can be sent as a result of some application layer trigger or on power-up. This command causes the ASIC specific software block 308 to perform any start up activities, such as turning on the hardware in preparation to perform various receiver functions.

In step 403, a command from the receiver stack processing system 400 is sent to the ASIC specific software block 308 specifying a set of frequencies (along with the bandwidth/channel plan) from which the receiver 300 selects a frequency to acquire the wireless signal. The set of frequencies and bandwidth may be retrieved from information provisioned at the wireless device.

In step 404, the receiver stack processing system 400 sends a command to the ASIC specific software block 308 to acquire the system. This command causes the ASIC specific software block 308 to read the overhead information on the selected frequency.

In step 405, a network event from the ASIC specific software block 308 is received by the receiver stack processing system 400 indicating that the overhead information has been acquired along with a network ID and the type of overhead information acquired (i.e., local-area or wide-area information). Once the overhead information has been acquired, the ASIC specific software block 308 sends, in step 406, a control information update message to the receiver stack processing system 400 indicating that control information is available along with the latest control information sequence numbers that have been received. In step 407, the receiver stack processing system 400 commands the ASIC specific software block 308 to get the control information. In response, the ASIC specific hardware block 308 reads the control channels and sends packets of control information, in step 408, to the receiver stack processing system 400 every frame. Included in each frame is side information which identifies the location of the control packet(s) in the frame and the sequence number of each packet. Once the receiver stack processing system 400 has determined that the control information has been received in its entirety, it instructs the ASIC specific software block 308 to stop receiving the control channel in step 409.

Figure 5:
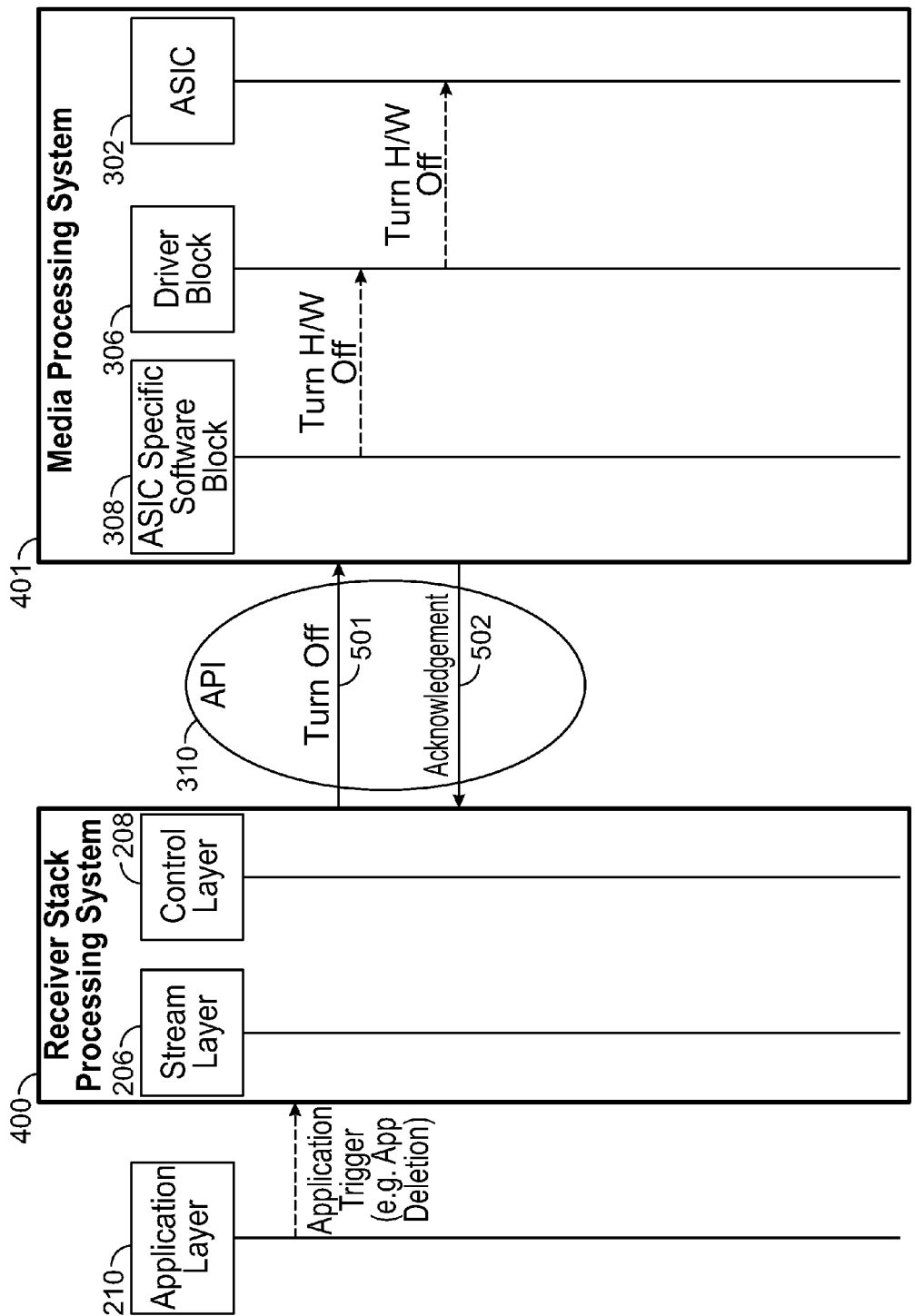
FIG. 5 is a diagram illustrating an example of the call flow to turn off the receiver.

FIG. 5 is a diagram illustrating an example of the call flow to turn off the receiver. In step 501, a command from the receiver stack processing system 400 is sent to the ASIC specific software block 308 to turn off the receiver. This command causes the ASIC specific software block 308 to instruct the other blocks in the media processing system to turn off the receiver. In step 502, an acknowledgement is sent back to the receiver stack processing system 400 indicting that the command has been accepted.

Figure 6:
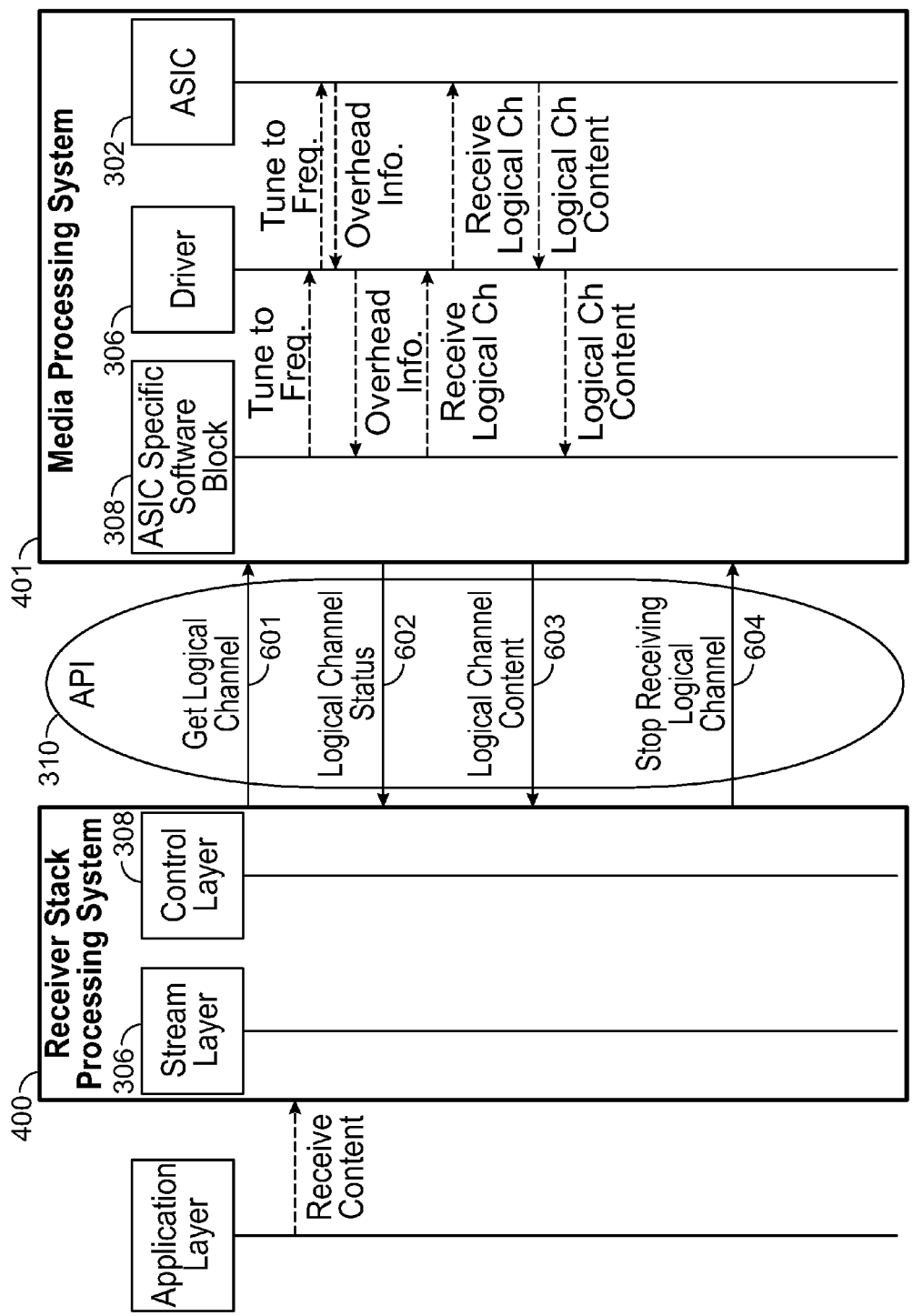
FIG. 6 is a diagram illustrating an example of the call flow when a specific logical channel is requested by a receiver stack in the receiver.

FIG. 6 is a diagram illustrating an example of the call flow when a specific logical channel is requested by the receiver stack processing system 400. This is usually caused by an application layer trigger to receive content for a specified flow. The control layer converts the flow ID into a mapped ID for the logical channel (along with the frequency on which that logical channel is being transmitted) so that the desired content can be received over the appropriate logical channel.

In step 601, the receiver stack processing system 400 commands the ASIC specific software block 308 to get the content on the specific logical channel ID. Along with logical channel ID, the physical layer characteristics of logical channel are provided (e.g., frequency, transmit mode, outer code rate). Also, the sequence numbers for the control packets are provided for the ASIC specific software block 308. This allows the ASIC specific software block 308 to determine if the control information maintained by the control layer is current and if there is a need to receive the control channel prior to receiving the logical channel.

In step 602, the ASIC specific software 308 acknowledges whether or not it will be able to service the command to get the requested logical channel.

In step 603, the ASIC specific software block 308 returns the contents on the logical channel retrieved from the receiver hardware block 302. The content on the logical channel is returned after the R-S decoding has been performed. The content is returned every frame until the receiver stack processing system 400 requests the ASIC specific software block 308 to stop receiving content on that logical channel in step 604.

Figure 7:
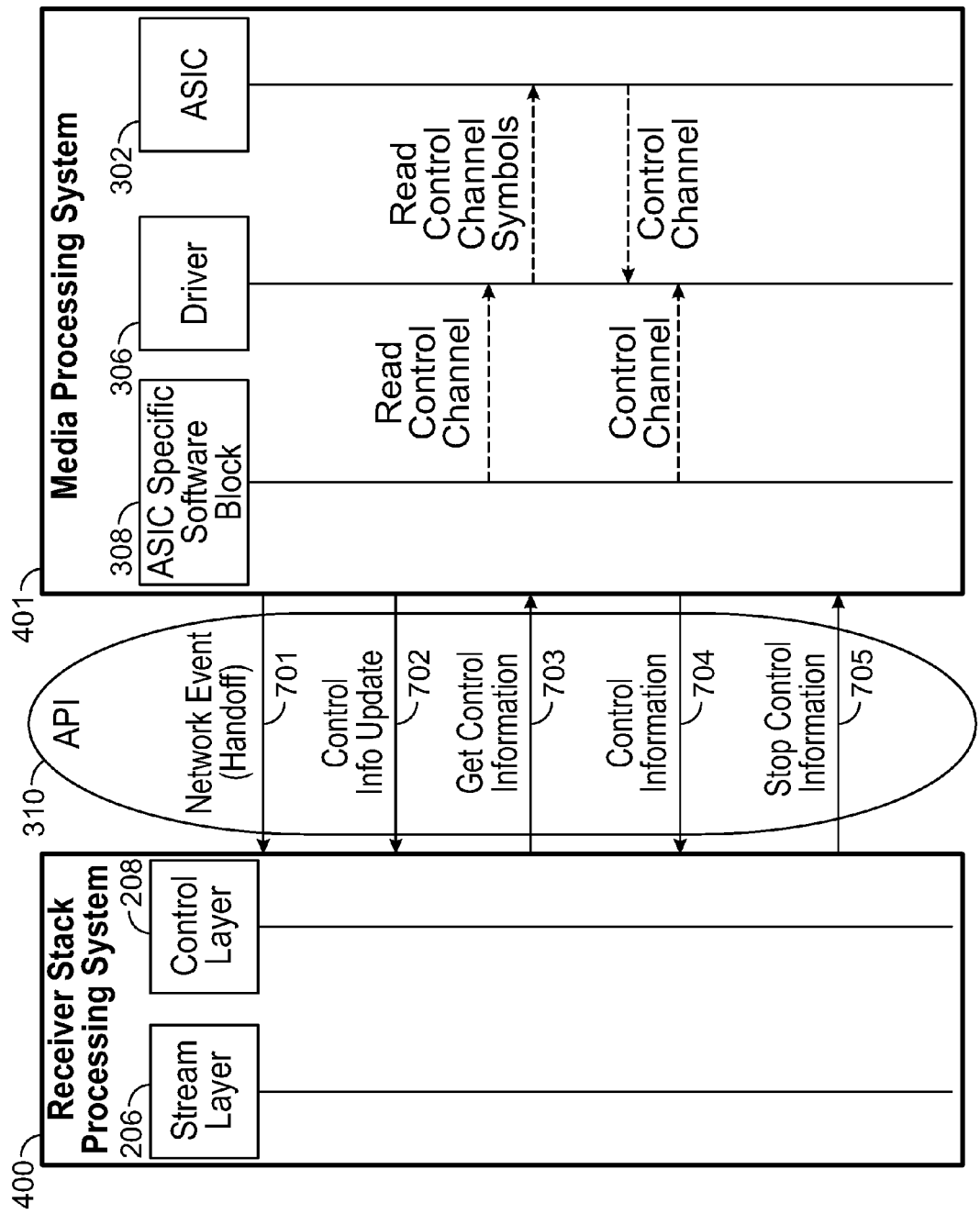
FIG. 7 is a diagram illustrating an example of the call flow when a wireless device transitions form the coverage region of a network or infrastructure to another.

FIG. 7 is a diagram illustrating an example of the call flow when the device transitions from the coverage region of a network or infrastructure to another. In step 701, a transition is detected when a change in the network or infrastructure ID. The network or infrastructure ID may be included in a system parameters message included in the overhead portion of the frame. Upon detecting a change, the ASIC specific software block 308 sends to the receiver stack processing system 400 a network event indicating that a transition is about to occur. In one configuration of the receiver 300, the ASIC specific software block 308 implements a hysteresis algorithm before sending this indication to receiver stack processing system 400 to avoid toggling the network event multiple times as the wireless device roams along the border between two networks or infrastructures.

In step 702, the ASIC specific software block 308 sends a control information update message to the receiver stack processing system 400 indicating that updated control information is available along with the latest control sequence numbers received. In step 703, the receiver stack processing system 400 commands the ASIC specific software block 308 to get the control information for the new area that the wireless device has moved into. In response, the ASIC specific hardware block 308 reads the control channels and sends packets of control information, in step 704, to the receiver stack processing system 400. Included in each frame is side information which identifies the location of the control packet(s) in the frame and the sequence number of each packet. In step 705, the receiver stack processing system 400 determines that the control information has been received in its entirety and instructs the ASIC specific software block 308 to stop receiving the control channel.

Figure 8:
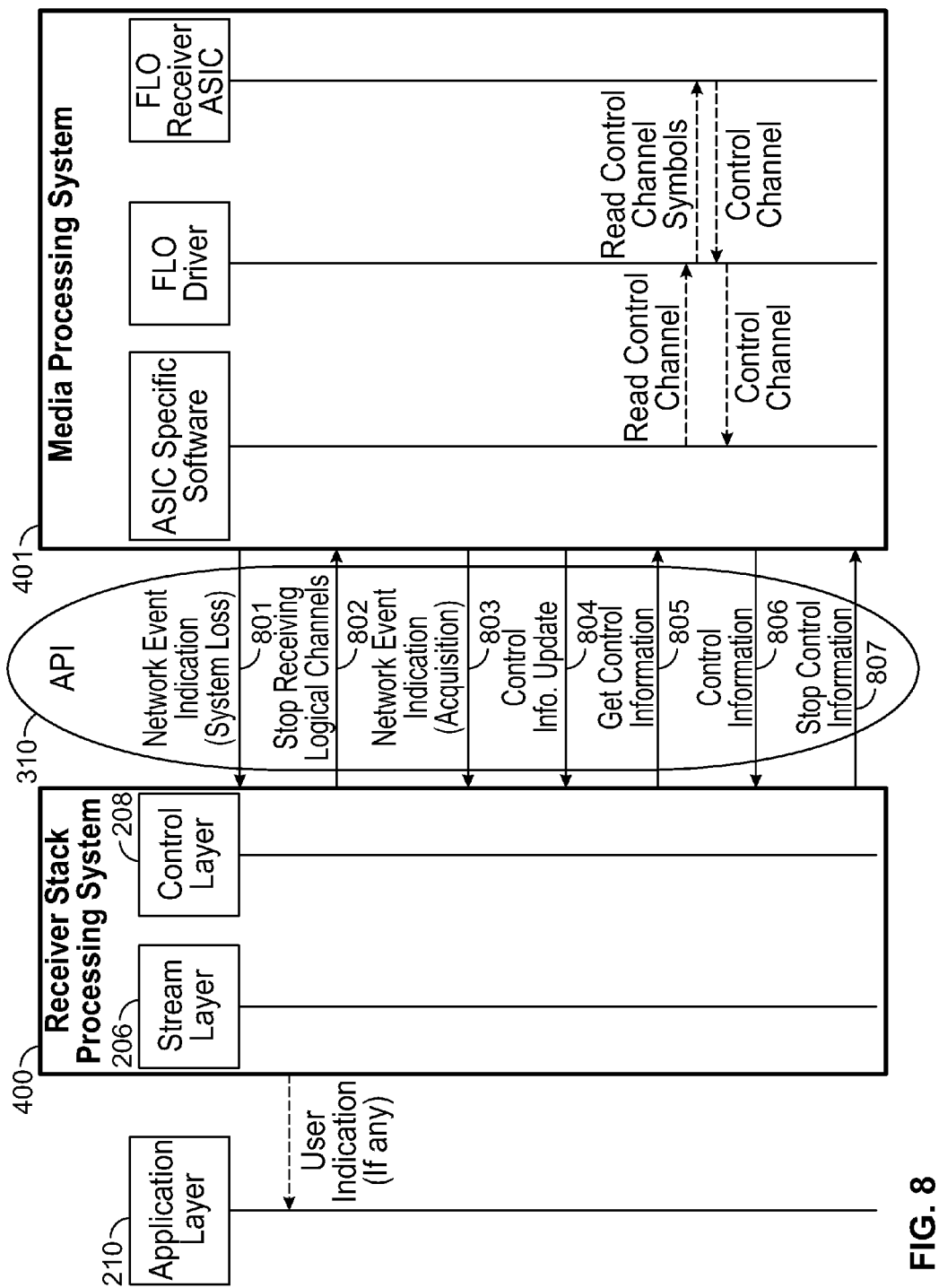
FIG. 8 is a diagram illustrating an example of the call flow when a receiver fails to meet the acquisition criteria.

FIG. 8 is a diagram illustrating an example of the call flow when a receiver fails to meet the acquisition criteria such as persistent errors received on an overhead channel or on some or all the logical channels being currently received by the receiver. When the receiver fails to meet this criteria, in step 801, the ASIC specific software block 308 sends a network event indication to the receiver stack processing system 400. Upon receiving this indication, the receiver stack 312 simply waits for the acquisition of the same or another network. An optional user indication may be sent to the application layer indicating that the receiver failed meet acquisition criteria.

In step 802, the receiver stack 312 sends a command to the ASIC specific software to abandon receiving data on the active logical channels and to free up any resources allocated towards receiving those logical channels.

Once a network is successfully acquired in step 803, the ASIC specific software block 308 sends a network event indication to receiver stack specifying the successful acquisition. If the acquired network is different form the last acquired network, or the control sequence numbers have been updated, the ASIC specific software block 308 sends a control information update message to the receiver stack processing system 400, in step 804, indicating that updated control information is available along with the latest control sequence numbers received. In step 805, the receiver stack processing system 400 commands the ASIC specific software block 308 to get the control information for the network that has been required. In response, the ASIC specific hardware block 308 reads the control channels and sends packets of control information, in step 806, to the receiver stack processing system 400. Included in each frame is side information which identifies the location of the control packet(s) in processing system 400 determines that the control information has been received in its entirety and instructs the ASIC specific software block 308 to stop receiving the control channel, in step 807.

Figure 9:
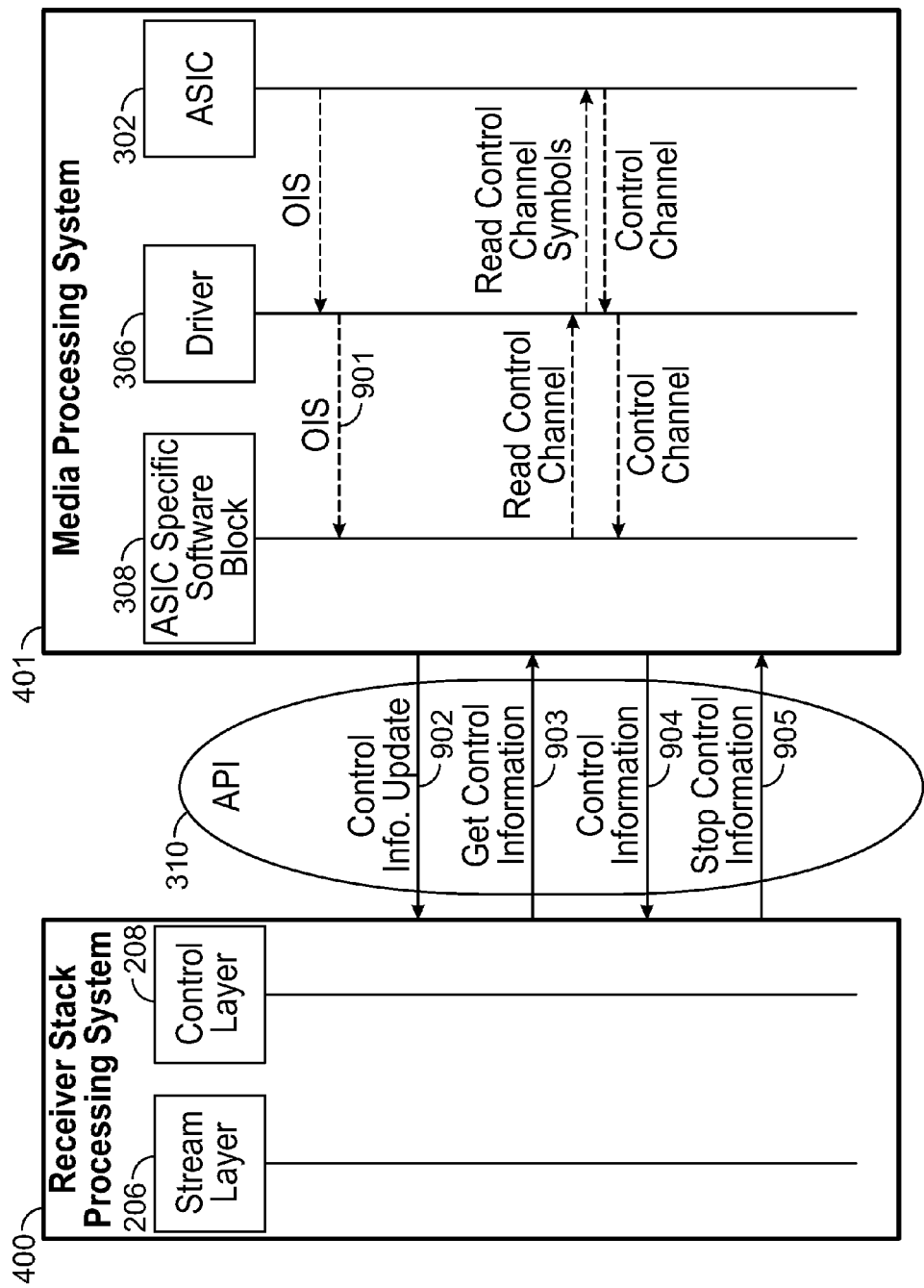
FIG. 9 is a diagram illustrating an example of the call flow when the receiver detects an update in the control information in its cache.

FIG. 9 is a diagram illustrating an example of the call flow when the receiver detects an update in the control information in its cache. The update control information is detected by the ASIC specific software block 308 when the control sequence numbers received in the overhead channel are different than the least received.

When ASIC specific software block receives the overhead information in step 901, it compares the control sequence numbers received with the last stored. If there is an update detected, the ASIC specific software block 308 sends a control information update message to the receiver stack processing system 400, in step 902, indicating that an update in the control information is available. In step 903, the receiver stack processing system 400 commands the ASIC specific software block 308 to get the control information. In response, the ASIC specific hardware block 308 reads the control channels and sends packets of control information, in step 904, to the receiver stack processing system 400. Included in each frame is side information which identifies the location of the control packet(s) in the frame and the sequence number of each packet. In step 905, the receiver stack processing system 400 determines that the control information has been received in its entirety and instructs the ASIC specific software block 308 to stop receiving the control channel.

Figure 10:
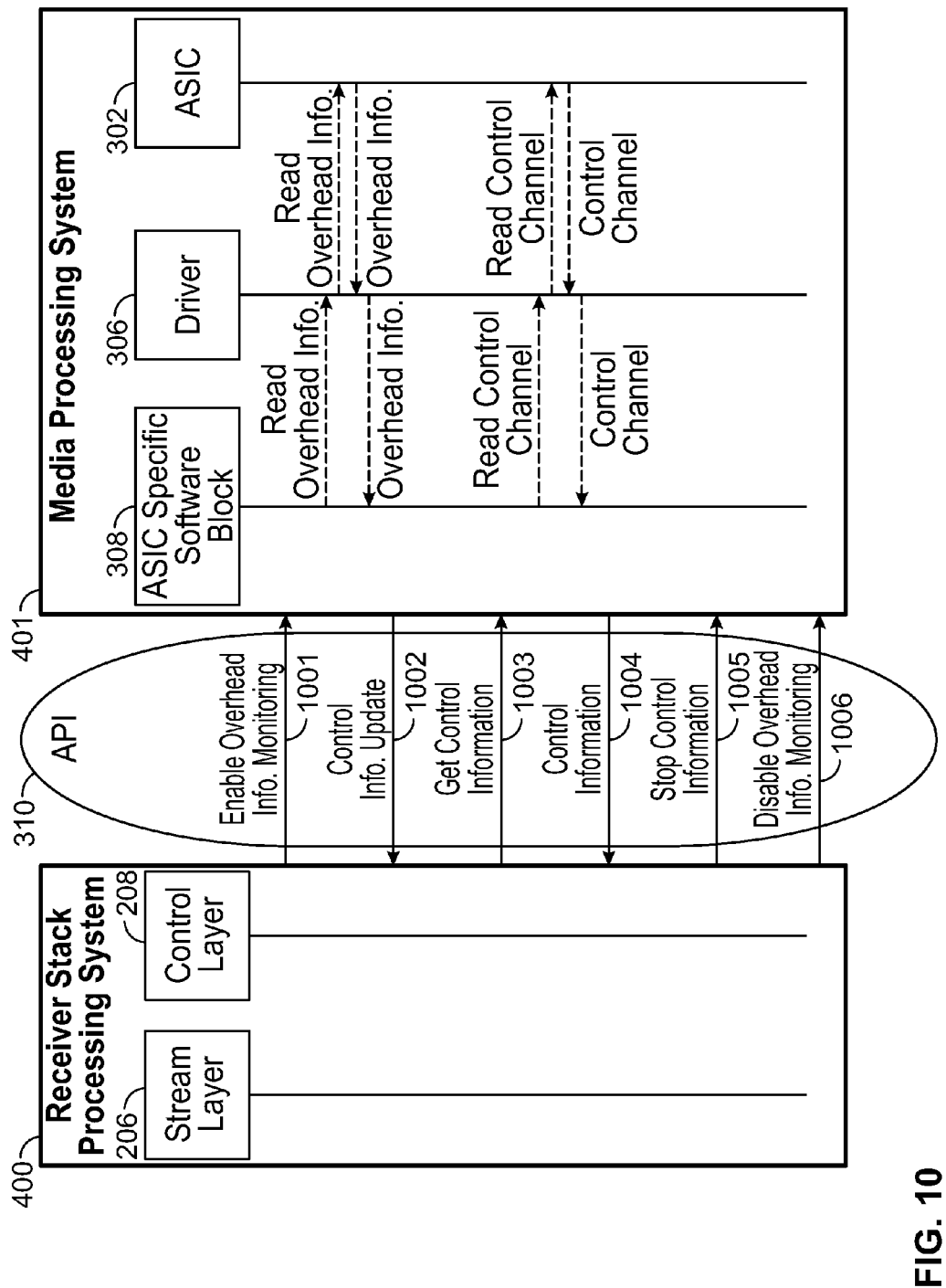
FIG. 10 is a diagram illustrating an example of the call flow to monitor overhead information.

FIG. 10 is a diagram illustrating an example of the call flow to monitor the overhead information. The overhead information may be monitored with a given periodicity as specified by a system parameters message in the overhead portion of the frame. In the absence of any other event that requires the receiver to read the overhead information, it can read the overhead information at the specific interval.

In step 1001, the receiver stack processing system 400 commands the ASIC specific software to enable monitoring of the overhead information based on the periodicity defined by the system parameters message. The ASIC specific software block 308 ensures that overhead information is monitored with at least this periodicity in absence of any other event causing it to read the overhead information.

In step 1002, an update of the control information is detected by the ASIC specific software block 308 when the control sequence numbers received in the overhead information are different than the last received. The receiver stack 312 receives a control information update message from the ASIC specific software block 308 indicating that an update in the control information is available. In step 1003, the receiver stack processing system 400 commands the ASIC specific software block 308 to get the control information. In response, the ASIC specific hardware block 308 reads the control channels and send packets of control information, in step 1004, to the receiver stack processing system 400. Included in each frame is side information which identifies the location of the control packet(s) in the frame and the sequence number of each packet. In step 1005, the receiver stack processing system 400 determines that the control information has been received in its entirety and instructs the ASIC specific software block 308 to stop receiving the control channel.

Upon being commanded to disable the periodic monitoring of the overhead information, the ASIC specific software block 308 disables it in step 1006. Steps 1002-1005 are conditional and are performed only when an update of control information is detected in the overhead information received.

Figure 11:
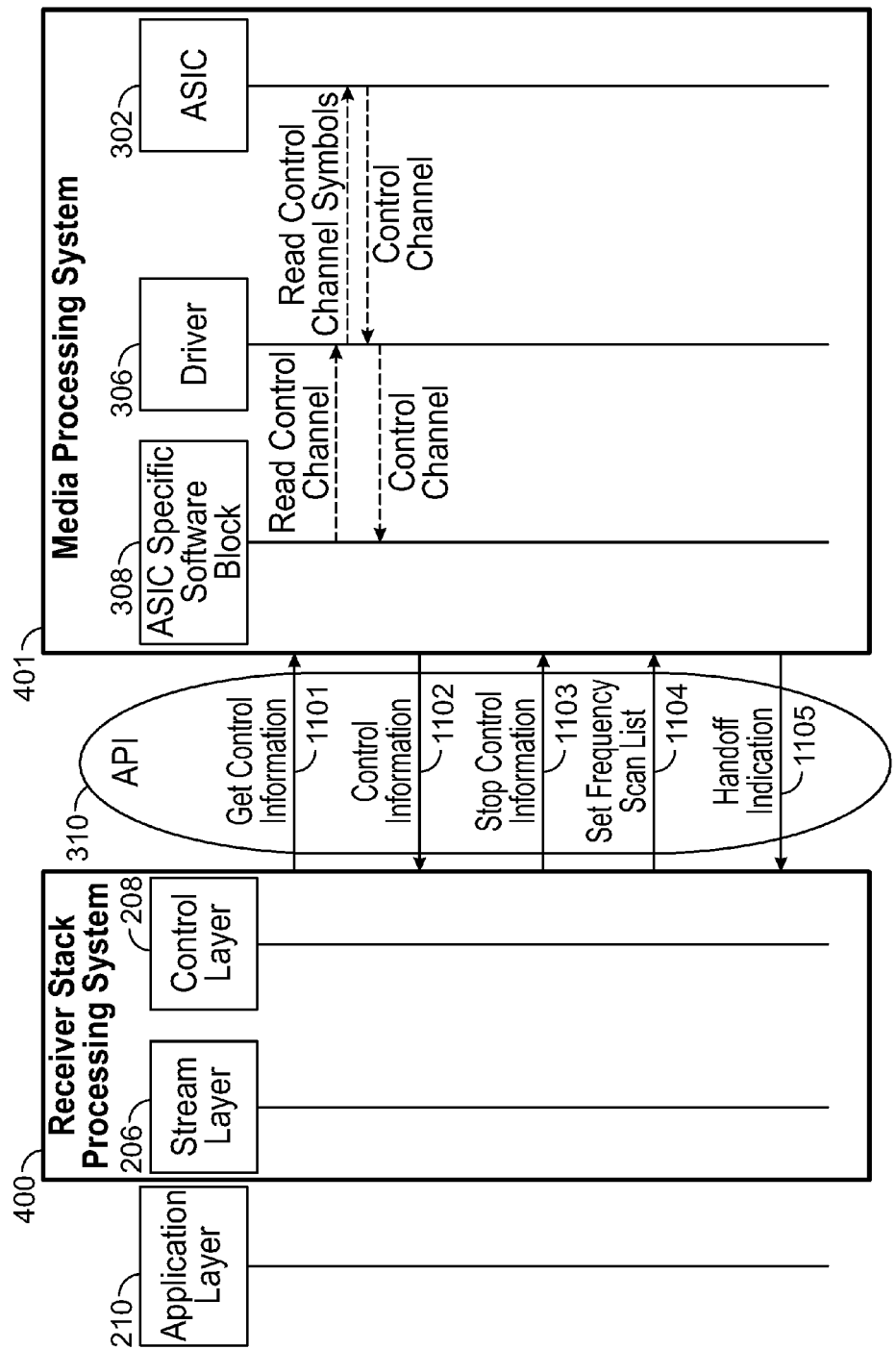
FIG. 11 is a diagram illustrating an example of the call flow of setting the frequency scan list for an ASIC specific software block in the receiver.

FIG. 11 is a diagram illustrating an example of the call flow of setting the frequency scan list for the ASIC specific software block 308. The frequency scan list is obtained from the neighborhood local-area information present in the control information. The ASIC specific software block 308 uses this scan list to implement handoff algorithms.

In step 1101, the receiver stack processing system 400 commands the ASIC specific software block 308 to get the control information. In response, the ASIC specific hardware block 308 reads the control channels and sends packets of control information, in step 1102, to the receiver stack processing system 400. Included in each frame is side information which identifies the location of the control packet(s) in the frame and the sequence number of each packet. In step 1103, the receiver stack processing system 400 determines that the control information has been received in its entirety and instructs the ASIC specific software block 308 to stop receiving the control channel.

In step 1104, the receiver stack processing system 400 makes a consolidated list of the neighboring systems by processing the neighborhood description message in the control information. The receiver stack processing system 400 then conveys this list to the ASIC specific software block 308. The ASIC specific software blocks 308 uses this list to execute handoff algorithms by using this list to monitor signals from the neighboring systems. If a handoff to a neighboring system is performed, an indication is sent to the receiver stack processing system 400 in step 1105 along with wide-area and local area differentiators for the destination system. Step 1105 is conditional and performed only when the handoff is performed. After handoff, the new system is acquired and overhead information received on it is used to detect further network events.

The information provisioned in a wireless device receiving transmission from a broadcast system contains a list (also referred to as a set) of scan parameters including frequency and bandwidth applicable for the transmission of a signal. This provisioned scan list (also referred to herein as an initial scan list or a default scan list) allows the wireless device to search for, and acquire, a desired signal being transmitted in the designated frequencies and bandwidths when the wireless device is first turned on. Once the wireless device starts receiving a given signal after being turned on, it builds up a new scan list based on the signaling information being transmitted by the network. This new scan list supersedes any scan list that is provisioned in the wireless device as the device uses the new scan list to select a desired signal from multiple signals being transmitted at any given location.

As a wireless device traverses different networks, it receives signaling information transmitted by the various networks. The scan list built from the signaling information contained in the current transmission of a currently visited network supersedes any existing scan list (whether the initially provisioned scan list or a scan list built using previous signaling information from a previously visited network).

Network configurations may allow for a situation where a wireless device moving into a new transmission area receives associated signaling information that conveys a scan list that is mutually exclusive from the originally provisioned scan list. Under these circumstances, if the device subsequently moves back into the coverage of the network for which the provisioned scan list was built, the device will not be able to acquire any signal. This situation is depicted in FIG. 13.

Figure 13:
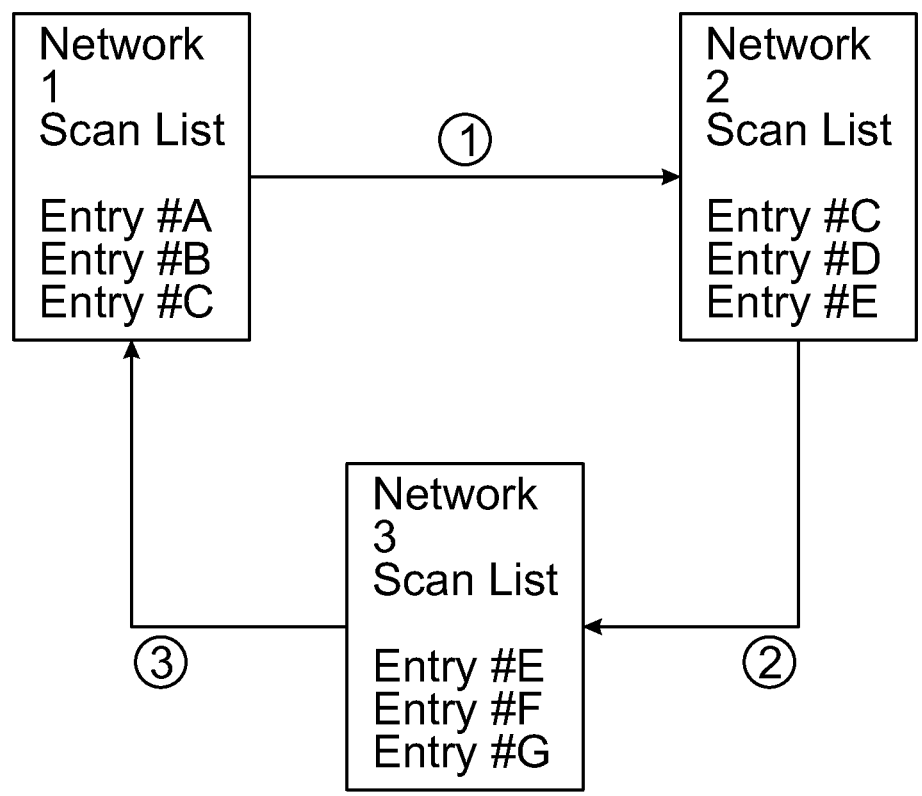
FIG. 13 diagrammatically illustrates the occurrence of mutually exclusive scan lists due to movement of a wireless communication device.

In the example of FIG. 13, a wireless device turns ON with its scan list entries initially provisioned for transmissions from Network 1. The device then moves from Network 1 to Network 2 (path 1), and builds a new scan list based on the signaling information transmitted by Network 2. This new scan list supersedes the provisioned scan list. Subsequently the device moves from Network 2 to Network 3 (path 2) and builds a further new scan list based on the signaling information transmitted by Network 3. This further new scan list supersedes the scan list that was built for Network 2. Finally, the wireless device moves from Network 3 back into Network 1 (path 3). The wireless device will attempt to acquire a signal in Network 1 based on the scan list built for Network 3. But the scan list built for Network 3 is mutually exclusive from the scan list used by Network 1, so the wireless device will not acquire a signal in Network 1.

In exemplary embodiments of the present work, the last scan list built from the signaling information from the last network visited may be superseded by the scan list with which the wireless device was originally provisioned. Then, in the situation of FIG. 13, the device entering Network 1 from Network 3 will be able to acquire a signal from Network 1 based on the originally provisioned scan list.

Figure 14:
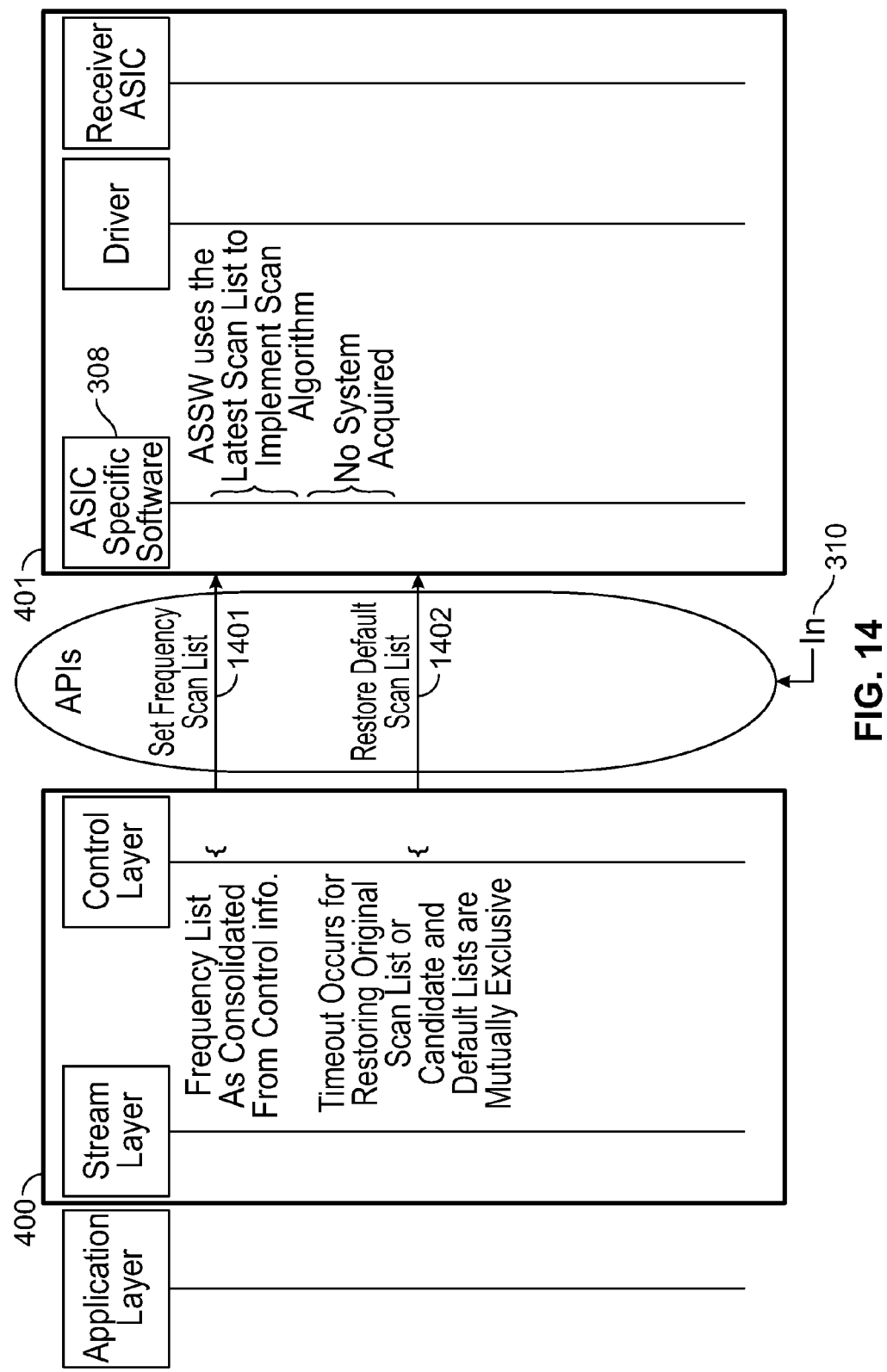
FIG. 14 is a diagram illustrating call flows that restore the default scan list according to exemplary embodiments of the present work.

FIG. 14 illustrates a call flow diagram for restoring the default (originally provisioned) scan list according to exemplary embodiments of the present work. In one embodiment illustrated by FIG. 14, the receiver stack processing system 400 first invokes an API 1401 that provides the media processing system 401 with a new scan list for use in network signal acquisition. The ASIC specific software 308 of media processing system 401 attempts to acquire a network signal using the new scan list. If a network signal is not acquired within a predetermined time-out period, then the receiver stack processing system invokes an API 1402 to instruct the media processing system 401 to restore the default scan list to supersede the new scan list that was provided by API 1401.

In some embodiments, shown by broken line in FIG. 14, the receiver stack processing system 400 automatically invokes the API 1402 if it determines that a candidate scan list and the default scan list are mutually exclusive. If this mutually exclusive relationship is detected, then the receiver stack processing system 400 does not invoke the API 1401, but rather invokes the API 1402 immediately. Thus, the candidate scan list, which would have replaced the current scan list if API 1401 had been invoked, is not passed to the media processing system 401. Instead, the media processing system 401 replaces the current scan list with the default scan list, as instructed by the API 1402.

Figure 12:
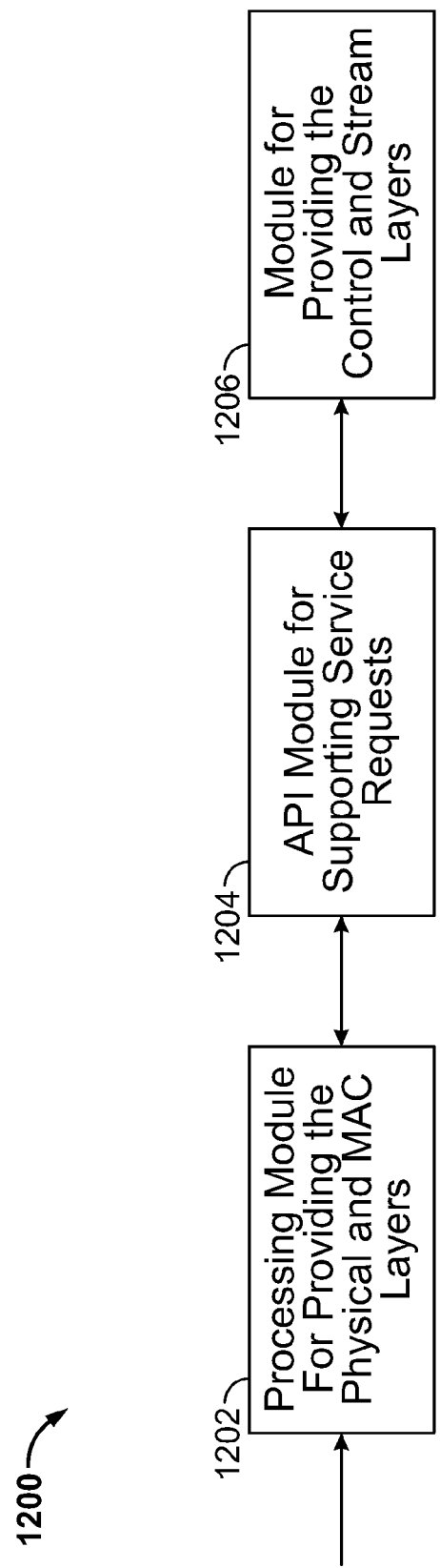
FIG. 12 is a functional block diagram of an apparatus configured to receive a signal in accordance with a protocol stack.

FIG. 12 is a functional block diagram of an apparatus configured to receive a signal in accordance with a protocol stack comprising a physical layer, MAC layer, control layer and stream layer. The apparatus 1200 may be a device 110 (see FIG. 1.), or one or more entities within the apparatus. The apparatus 1200 includes a module 1202 for providing the physical and MAC layers, a module 1206 for providing the control and stream layers, and an API module 1204 for supporting service requests.

The previous description is provided to enable any person skilled in the art to practice the various embodiments described therein. Various modifications to these embodiments will be readily apparent to those skilled in the art, and the generic principals defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus configured to receive a signal in accordance with a protocol stack that contains a physical layer, a medium access control (MAC) layer, a control layer and a stream layer, comprising:
  a processor;
  a receiver stack processing system configured to provide the control and stream layers;
  a media processing system configured to provide the physical and MAC layers; and
  an application programming interface (API) to support communication between the receiver stack processing system and the media processing system;
  wherein said receiver stack processing system is configured to invoke said API to instruct said media processing system to replace a current set of signal acquisition parameters currently used by said media processing system for signal acquisition, with an initial set of signal acquisition parameters that was initially provisioned for said media processing system to use for signal acquisition,
  wherein said receiver stack processing system is configured to determine when a candidate set of signal acquisition parameters and said initial set of signal acquisition parameters are mutually exclusive such that no signal acquisition parameters of said candidate set of signal acquisition parameters are included in said initial set of signal acquisition parameters,
  wherein said receiver stack processing system is configured to, when said candidate set of signal acquisition parameters are mutually exclusive of said initial set of signal acquisition parameters, replace said candidate set of signal acquisition parameters with said initial set of signal acquisition parameters,
  wherein said candidate set of signal acquisition parameters and said initial set of signal acquisition parameters each comprise a plurality of acquisition parameters,
  wherein said receiver stack processing system is configured to invoke said API when said candidate set of signal acquisition parameters that would otherwise become the current set of signal acquisition parameters is mutually exclusive with respect to said initial set of signal acquisition parameters, and
  wherein said signal acquisition parameters include signal acquisition frequencies.

2. The apparatus of claim 1, wherein said receiver stack processing system is configured to invoke said API after a predetermined amount of time has elapsed without successful signal acquisition using the current set of signal acquisition parameters.

3. An apparatus configured to receive a signal in accordance with a protocol stack that contains a physical layer, a medium access control (MAC) layer, a control layer and a stream layer, comprising:

first processing means for providing the control and stream layers;

second processing means for providing the physical and MAC layers;

means for providing an application programming interface (API) that supports communication between said first processing means and said second processing means;

wherein said first processing means includes means for invoking said API to instruct said second processing means to replace a current set of signal acquisition parameters currently used for signal acquisition by said second processing means with an initial set of signal acquisition parameters that was initially provisioned for said second processing means to use for signal acquisition, wherein said first processing means includes means for determining when a candidate set of signal acquisition parameters and said initial set of signal acquisition parameters are mutually exclusive such that no signal acquisition parameters of said candidate set of signal acquisition parameters are included in said initial set of signal acquisition parameters, wherein said first processing means includes means for replacing said candidate set of signal acquisition parameters with said initial set of signal acquisition parameters when said candidate set of signal acquisition parameters are mutually exclusive of said initial set of signal acquisition parameters, wherein said candidate set of signal acquisition parameters and said initial set of signal acquisition parameters each comprise a plurality of acquisition parameters, wherein said first processing means includes means for invoking said API when said candidate set of signal acquisition parameters that would otherwise become the current set of signal acquisition parameters is mutually exclusive with respect to said initial set of signal acquisition parameters, and wherein said signal acquisition parameters include signal acquisition frequencies.

4. The apparatus of claim 3, wherein said first processing means includes means for invoking said API after a predetermined amount of time has elapsed without successful signal acquisition using the current set of signal acquisition parameters.

5. A method of communication, comprising:

receiving a signal in accordance with a protocol stack having a first portion that contains a control layer and a stream layer, and a second portion that contains a physical layer and a medium access control (MAC) layer;

the first portion invoking an application programming interface (API) to instruct the second portion to replace a current set of signal acquisition parameters currently used by the second portion for signal acquisition with an initial set of signal acquisition parameters that was initially provisioned for the second portion to use for signal acquisition;

the first portion determining when a candidate set of signal acquisition parameters and said initial set of signal acquisition parameters are mutually exclusive such that no signal acquisition parameters of said candidate set of signal acquisition parameters are included in said initial set of signal acquisition parameters;

the first portion replacing said candidate set of signal acquisition parameters with said initial set of signal acquisition parameters when said candidate set of signal acquisition parameters are mutually exclusive of said initial set of signal acquisition parameters, wherein said candidate set of signal acquisition parameters and said initial set of signal acquisition parameters each comprise a plurality of acquisition parameters, the first portion invoking said API when said candidate set of signal acquisition parameters that would otherwise become the current set of signal acquisition parameters is mutually exclusive with respect to said initial set of signal acquisition parameters, and wherein said signal acquisition parameters include signal acquisition frequencies.

6. The method of claim 5, including the first portion invoking said API after a predetermined amount of time has elapsed without successful signal acquisition using the current set of signal acquisition parameters.

7. A non-transitory machine-readable medium comprising instructions executable by one or more processors in an apparatus, the apparatus being configured to receive a signal in accordance with a protocol stack that contains a physical layer, a medium access control (MAC) layer, a control layer and a stream layer, the physical layer and the MAC layer implemented with a media processing system, and the control layer and the stream layer implemented with a receiver stack processing system, the instructions comprising:

a receiver stack code segment to implement the receiver stack processing system; and an application programming interface (API) code segment that implements an API to support communication between the receiver stack processing system and the media processing system; wherein the receiver stack processing system invokes said API to instruct the media processing system to replace a current set of signal acquisition parameters currently used by the media processing system for signal acquisition with an initial set of signal acquisition parameters that was initially provisioned for the media processing system to use for signal acquisition, wherein the receiver stack processing system determines when a candidate set of signal acquisition parameters and said initial set of signal acquisition parameters are mutually exclusive such that no signal acquisition parameters of said candidate set of signal acquisition parameters are included in said initial set of signal acquisition parameters, wherein said receiver stack processing system is configured to, when said candidate set of signal acquisition parameters are mutually exclusive of said initial set of signal acquisition parameters, replace said candidate set of signal acquisition parameters with said initial set of signal acquisition parameters, wherein said candidate set of signal acquisition parameters and said initial set of signal acquisition parameters each comprise a plurality of acquisition parameters, wherein the receiver stack processing system invokes said API when said candidate set of signal acquisition parameters that would otherwise become the current set of signal acquisition parameters is mutually exclusive with respect to said initial set of signal acquisition parameters, and wherein said signal acquisition parameters include signal acquisition frequencies.

8. The non-transitory machine-readable medium of claim 7, wherein the receiver stack processing system invokes said API after a predetermined amount of time has elapsed without successful signal acquisition using the current set of signal acquisition parameters.

* * * * *